US 8,153,003 B2

(12) United States Patent
van Rooyen

(10) Patent No.: US 8,153,003 B2
(45) Date of Patent: Apr. 10, 2012

(54) BELT FILTER APPARATUS

(75) Inventor: Kenneth Carl van Rooyen, Randburg (ZA)

(73) Assignee: Cabanga Innovations (pty) Ltd, Randburg (ZA)

( * ) Notice: Subject to any disclaimer, the term of this patent is extended or adjusted under 35 U.S.C. 154(b) by 76 days.

(21) Appl. No.: 12/841,620

(22) Filed: Jul. 22, 2010

(65) Prior Publication Data

US 2011/0042292 A1 Feb. 24, 2011

Related U.S. Application Data

(62) Division of application No. 12/299,386, filed as application No. PCT/IB2007/051680 on May 4, 2007.

(30) Foreign Application Priority Data

May 4, 2006 (ZA) .................. 2006/03554
Sep. 20, 2006 (ZA) .................. 2006/07876

(51) Int. Cl.
*B01D 33/00* (2006.01)
*B01D 25/32* (2006.01)
(52) U.S. Cl. ........ 210/258; 210/297; 210/298; 210/319; 210/356; 210/400; 210/406; 210/407; 210/408; 210/416.1

(58) Field of Classification Search .................. 210/258, 210/297, 298, 319, 356, 400, 406–408, 416.1
See application file for complete search history.

(56) References Cited

U.S. PATENT DOCUMENTS 3,358,834 A * 12/1967 El-Hindi ........................ 210/780
3,531,404 A    9/1970 Goodman et al.
3,836,681 A * 9/1974 Dodd ............................. 426/272

FOREIGN PATENT DOCUMENTS

DE       4302922 C1    8/1994
WO     03055570 A1    7/2003

* cited by examiner

*Primary Examiner* — Chester Barry
(74) *Attorney, Agent, or Firm* — The Webb Law Firm

(57) ABSTRACT

The invention concerns a belt filter apparatus including a first belt filter section on which a mixture of fine material and a liquid can be placed hydraulically to create partially dry fine material and a second belt filter section on which the partially dry fine material can be placed in order to undergo a second drying cycle. The belt filter apparatus also includes an arrangement for mechanically placing the partially dry fine material from the first belt filter section onto the second belt filter section as well as a liquid collection arrangement for providing fluid communication between the first and second belt filter sections and a vacuum for drying the fine material. The belt filter apparatus includes an agitator formation for increasing the permeability of the fine material to enhance the ability of the liquid to be released from the fine material and be collected by the liquid collection arrangement.

7 Claims, 3 Drawing Sheets

BELT FILTER APPARATUS

CROSS-REFERENCE TO RELATED APPLICATION

This application is a divisional application of co-pending U.S. patent application Ser. No. 12/299,386, filed on Feb. 18, 2009, which is the United States national stage filing under 35 U.S.C. 371 of International Application No. PCT/IB2007/051680, filed on May 4, 2007. The contents of the above-referenced applications are incorporated herein by reference in their entireties.

BACKGROUND TO THE INVENTION

1. Field of the Invention

This invention relates to a belt filter apparatus. In particular the invention concerns a belt filter apparatus for use in drying fine material, typically fine coal. The invention also extends to a method of drying fine material.

2. Description of the Related Art

Coal which is mined from the ground often contains unwanted impurities such as carbonaceous and non-carbonaceous material which are reduced to various different sized fragments. Users of coal, however, normally require coal of consistent quality. For this reason mined coal should undergo a process referred to as beneficiation, also known as coal preparation or coal washing. Coal beneficiation refers to the treatment of coal to ensure consistent quality and to enhance its suitability for specific end-users.

The treatment of coal will be dependent upon the physical properties of the coal and its intended purpose. For certain applications the treatment may simply require crushing while in other instances it may be necessary for the coal to undergo a complex process for reducing impurities.

In order to remove impurities, coal is crushed and thereafter separated into various coal fractions, whereafter the fractions typically undergo a further treatment referred to as dense medium separation. In this process, the coal is separated from impurities by being floated in a tank containing a liquid of specific gravity, usually water holding finely ground magnetite in suspension. Due to the fact that the coal is less dense than the liquid, it will float and can be separated off while heavier rock and other impurities sink and can be removed as waste.

The process of beneficiation typically generates a fine fraction referred to as slurry, a slightly coarser fraction which is known as duff and an even coarser fraction known as discard. In order for the fine fractions to be saleable the moisture would need to be removed from the fine fractions. In a South African context water is a scarce commodity and the use thereof consequently strictly controlled by the South African Department of Water Affairs and Forestry. It will, therefore, be appreciated that coal should be separated from the water in the slurry and duff in such a manner that the water can be re-used in future beneficiation processes. The mining industry has for this reason developed various methods for drying fine and ultra fine materials. These methods typically utilise drying beds, belt filter presses and hydraulic filter presses. A brief description of the mentioned methods is provided below together with advantages and drawbacks associated with the methods.

Drying beds are normally provided by constructing lined, large surface area dams into which slurry can be placed. The water can hereafter be removed from the drying beds with the use of for example, penstock systems. Water is decanted from the surface of the slurry, the so-called supernatant water, and once the drying beds are dry the fine material is mechanically excavated and sold. Making use of drying beds has the advantage that once the drying beds are in place, drying costs are minimal while the drying beds can handle large volumes of slurry. The drawbacks of making use of drying beds include a substantial capital outlay for constructing such drying beds, loss of water due to evaporation, loss of income due to delays during the period of drying, a potential for environmental spills due to over-topping and chemical breakdown of coal due to prolonged exposure to oxidation.

A belt filter press typically comprises two belts between which slurry can be placed and thereafter pressed. A belt filter also makes use of a vacuum for sucking water from the filter. The advantages of using a belt filter press includes that continued drying can take place, a relative small operating area is required and water that is removed from slurry can be recovered immediately. Further advantages include that the dried product can be added to the product line and a relatively quick turnaround of revenue is possible. The drawbacks of using belt filter presses include high installation costs, high material and maintenance costs and consequential high running costs.

A very important drawback of making use of a belt filter press is that by compressing hydraulically placed material, the permeability of such material is reduced with a consequential reduction in the ability of extracting all free water. Compressing the water containing material only serves to increase the pore pressure of the material with the consequential result that the largest volume of water is extracted prior to compaction. Energy which is therefore used with a view of removing free water is in fact wasted.

A hydraulic filter press comprises a bag in which fine material can be placed whereafter the material in the bag can be compressed hydraulically. The hydraulic filter press also makes use of a vacuum for sucking water from the bag. Upon completion of a drying cycle, batch material is blown from the bag into a bin and the cycle repeated. Advantages of making use of a hydraulic filter press include fast recovery of water, a minimal potential for detrimental environmental impact and fast realisation of a saleable product. The drawbacks of hydraulic filter presses, however, include high installation costs, high running and maintenance costs as well as batch processing, i.e. there is no continuous flow of material and consequently large volumes of liquid should be stored. Making use of hydraulic filter presses also results in compressed materials with increased pore pressure and reduced permeabilities similar to the situation with belt filter presses.

It is an object of the present invention to provide an alternative apparatus and method for use in drying coal slurry and which addresses the drawbacks of existing technology.

SUMMARY OF THE INVENTION

According to a first aspect of the present invention there is provided a belt filter apparatus comprising:

a first belt filter section on which a mixture of a fine material and a liquid can be placed hydraulically in order to undergo a first drying cycle to create partially dry fine material, the fist belt filter section including a belt filter of a permeable fabric;

a second belt filter section on which the partially dry fine material can be placed in order to undergo a second drying cycle, the second belt filter section including a belt filter of a permeable fabric;

means for mechanically placing the partially dry fine material from the first belt filter section onto the second belt filter section; and a liquid collection arrangement for providing fluid communication between the first and second belt filter sections and a vacuum, wherein in use the vacuum dries the fine material by drawing liquid through the permeable fabric of the first and second belt filter sections and into the liquid collection arrangement.

Preferably the permeable fabric of the first and second belt filter sections is a non-woven fabric or a micro-pore fabric.

More preferably the permeable fabric of the first and second belt filter sections includes reinforcing.

Advantageously the permeable fabric of the first and second belt filter sections has a permeability of not less than $10^{-3}$ cm/s.

In an embodiment of the invention the permeable fabric of the first and second belt filter sections is a geo-fabric which is reinforced with nylon netting.

Advantageously the first and second belt filter sections are formed by providing a first set of pulleys and a second set of pulleys about which a single belt filter can be moved.

Typically the means for mechanically placing the partially dry fine material comprises an impulse blower which is located proximate a drop-off point between the first belt filter section and the second belt filter section, in use the impulse blower serving to impart jets of air onto the first belt filter section such that the partially dry fine material on the belt filter can be forced therefrom to fall onto the second belt filter section.

Alternatively, the means for mechanically placing the partially dry fine material comprises a cam which is located proximate a drop-off point between the first belt filter section and the second belt filter section, in use the cam serving to impact on the first belt filter section thereby forcing the partially dry fine material to fall onto the second belt filter section.

Preferably the belt filter apparatus includes an agitator formation for redistributing partially dry fine material on the first belt filter section and/or the second belt filter section.

More preferably the agitator formation is provided in the form of at least one blower and/or at least one rotatable cam.

Advantageously the liquid collection arrangement includes liquid collectors which are locatable below the first and second belt filter sections for collecting liquid which is removed from the fine material during the first and second drying cycles.

Preferably the liquid collection arrangement also includes ducting for providing fluid communication between the liquid collectors and a liquid storage container.

According to a second aspect of the present invention there is provided a method of drying fine material comprising the steps of:
  providing a mixture of a liquid and fine material;
  hydraulically placing the mixture of liquid and fine material on a first belt filter section;
  allowing the mixture of liquid and fine material to undergo a first drying cycle on the first belt filter section to form partially dry fine material;
  mechanically placing the partially dry fine material on a second belt filter section; and
  allowing the partially dry fine material to undergo a second drying cycle on the second belt filter section.

Preferably the method of drying fine material includes the step of providing a vacuum which is in fluid communication with the first and the second belt filter sections.

Typically the mixture of liquid and fine material is coal slurry.

According to a third aspect of the present invention there is provided a belt filter apparatus comprising:

a first belt filter section on which a mixture of a fine material and a liquid can be placed hydraulically in order to undergo a first drying cycle to create partially dry fine material;
  a second belt filter section on which the partially dry fine material can be placed mechanically in order to undergo a second drying cycle; and
  means for mechanically placing the partially dry fine material from the first belt filter section onto the second belt filter section;

wherein the first and second belt filter sections include a belt filter comprising a fabric having a permeability of not less than $10^{-3}$ cm/s.

According to a fourth aspect of the invention there is provided a belt filter apparatus comprising:
  a belt filter section on which a mixture of a fine material and a liquid can be placed hydraulically in order to undergo a drying cycle, the belt filter section including a belt filter of a permeable fabric;
  an agitator formation for redistributing partially dry fine material on the belt filter section;
  a liquid collection arrangement for providing fluid communication between the belt filter section and a vacuum,
wherein in use the vacuum dries the fine material by drawing liquid through the permeable fabric of the belt filter section and into the liquid collection arrangement.

BRIEF DESCRIPTION OF THE DRAWINGS

The invention will now be described in more detail, by way of example only, with reference to the accompanying drawings.

In the drawings.

DESCRIPTION OF THE ILLUSTRATED EMBODIMENTS

Figure 1:
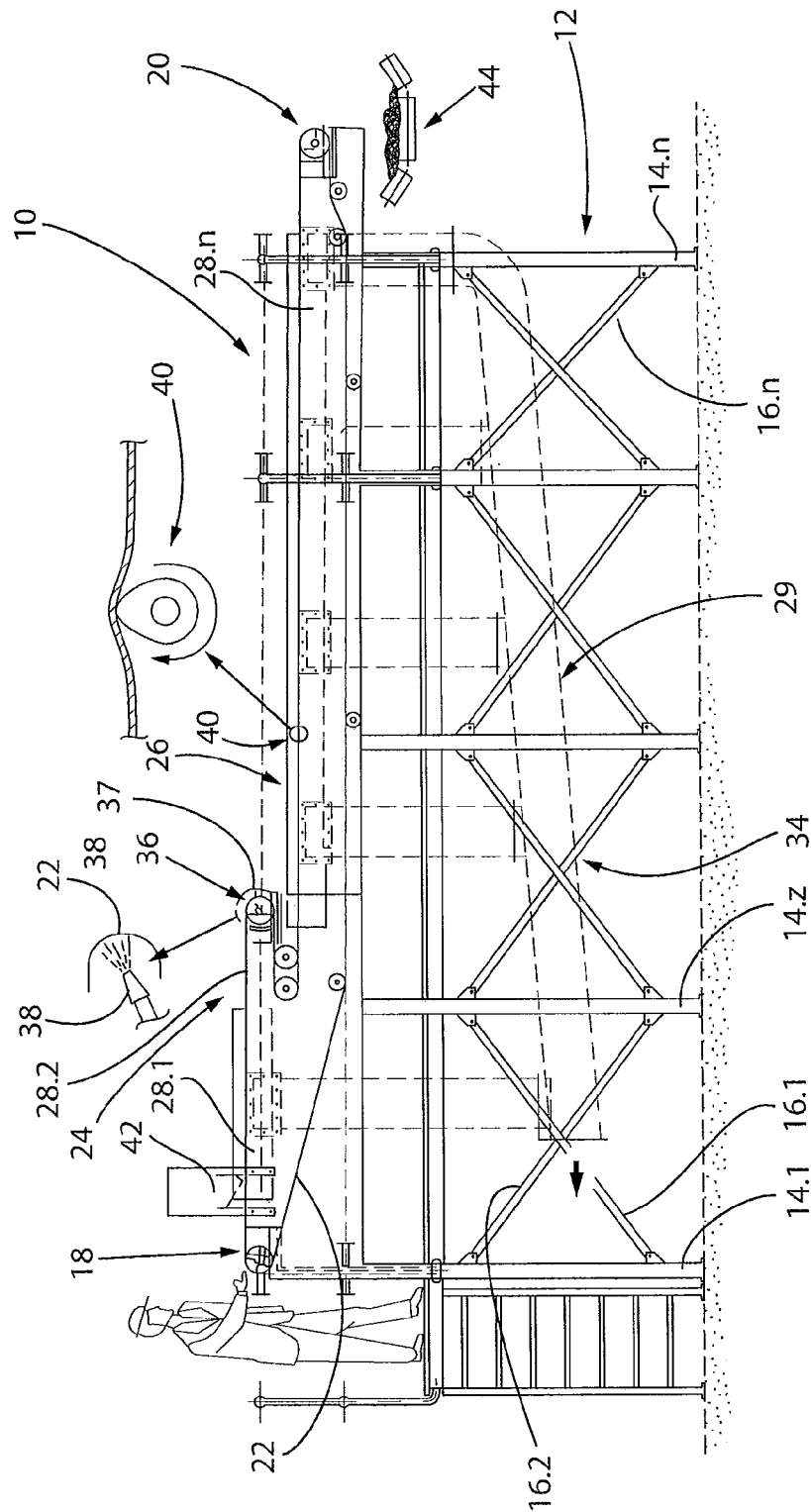
FIG. 1 shows a front view of a belt filter apparatus in accordance with a first embodiment of the present invention.
Figure 2:
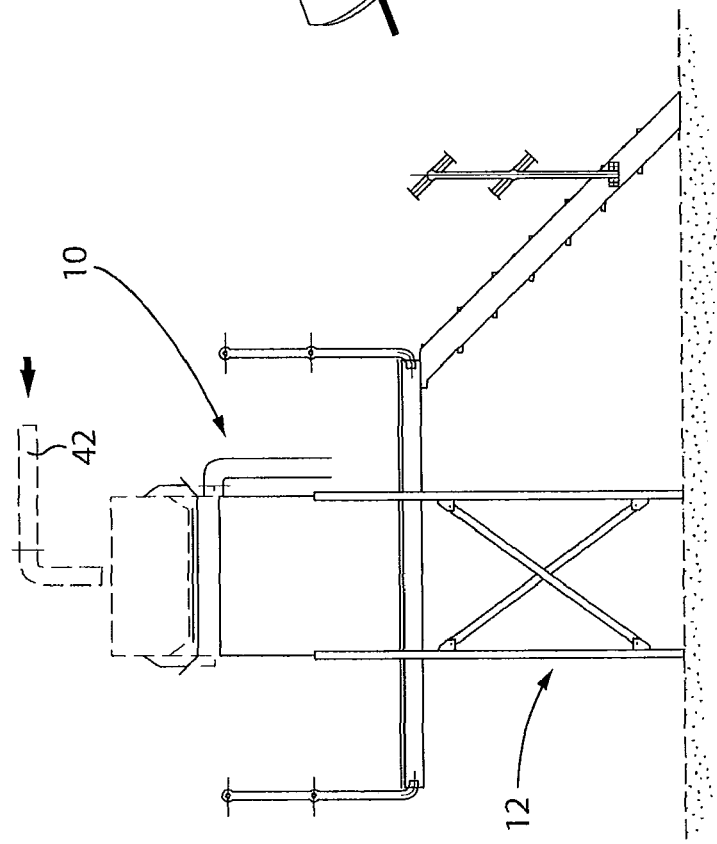
FIG. 2 shows a side view of the belt filter apparatus.

FIG. 1 and FIG. 2 show a belt filter apparatus in accordance with a first embodiment of the invention, generally indicated with the reference numeral 10. The belt filter apparatus 10 includes a support structure 12 comprising a number of support pillars 14.1, 14.2, ..., 14.n and support struts 16.1, 16.2, ..., 16.n which are configured as shown. The support structure 12 carries a number of pulleys which are arranged to form a first set of pulleys 18 and a second set of pulleys 20. A single belt filter 22 is wrapped about the first and second set of pulleys 18 and 20 respectively to provide a first and second belt filter section 24 and 26.

The belt filter 22 is produced from a non-woven fabric having a permeability of at least $10^{-3}$ cm/s. In this embodiment of the invention the fabric is a geo-fabric produced by Kaytech and sold under the trade name Biddum™. The fabric of the belt filter 22 is reinforced with nylon netting.

Figure 3:
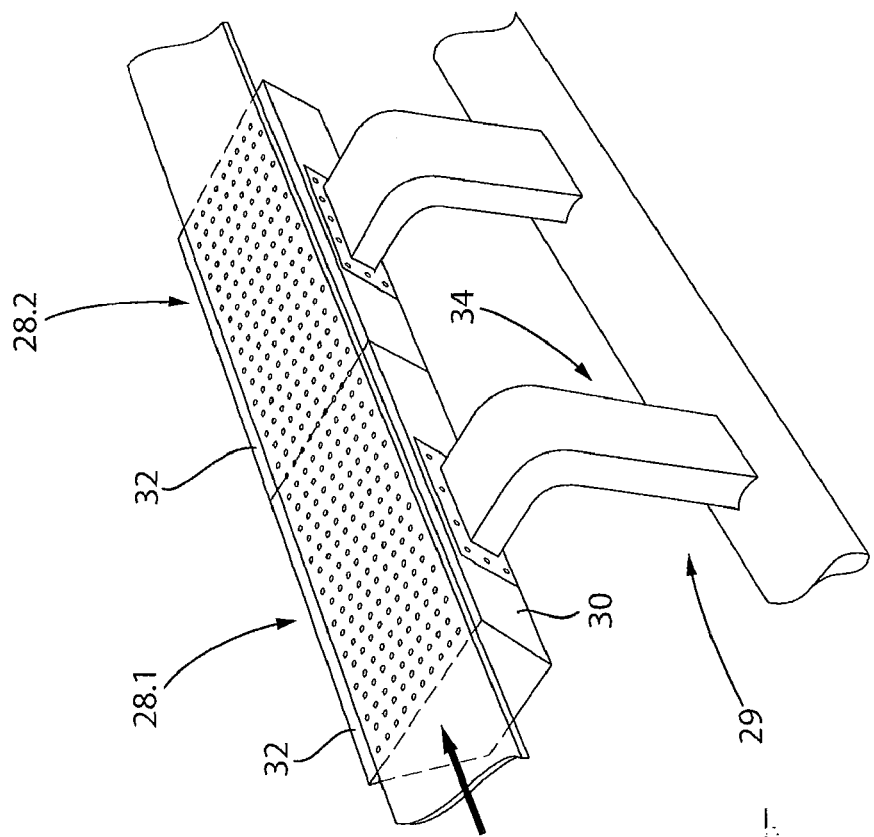
FIG. 3 shows a perspective view of a liquid collector for use in the belt filter apparatus of the invention.

A number of liquid collectors 28.1, 28.2, ..., 28.n are provided under the belt filter 22 in each of the first and second belt filter sections 24 and 26. As shown in FIG. 3, each liquid collector 28.1, 28.2, ..., 28.n comprises a collector body 30 which is covered with a perforated deck plate 32. The liquid collectors 28.1, 28.2, ..., 28.n are connected in fluid communication with a liquid storage container, not shown in the drawings, via a network of ducting 34. The liquid collectors 28.1, 28.2, ..., 28.n and ducting 34 provide a liquid collection arrangement which is generally indicated with the reference numeral 29.

At the end of the first belt filter section 24 means for mechanically placing partially dry fine material, indicated with the reference numeral 36, is provided. In this embodiment of the invention the means for mechanically placing 36 is formed by firstly providing that the first belt filter section 24 includes a drop-off point 37 located between the first belt filter section 24 and the second belt filter section 26 and secondly by providing at least one impulse blower 38 which is placed adjacent the drop-off point 37. By having the impulse blower 38 imparting bursts of air onto the belt filter 22 at the drop-off point, all partially dry material on the belt filter 22 will be dislodged such that it can fall onto the second belt filter section 26 thereby being mechanically placed. The reason for placing partially dry fine material mechanically unto the second belt filter section 26 will be discussed below.

The belt filter apparatus 10 further includes an agitator formation, indicated with the reference numeral 40, for redistributing the fine material which is transported by the belt filter 22 in the second belt filter section 26. By redistributing the partially dry material the permeability thereof is enhanced.

In this embodiment of the invention the agitator formation 40 is provided in the form of a cam which can rotate to impart blows on the belt filter 22, thereby enhancing the permeability of the partially dry fine material on the second belt filter section 26. The functionality of the cam 40 will become apparent from the description that follows below.

In use coal slurry, which is a mixture of fine coal material and water, will typically be fed with a conduit 42 from a dense medium separator, not shown in the drawings, and be placed hydraulically on the belt filter 22 at one end of the first belt filter section 24. Simultaneous to, or just prior to the slurry being placed on the belt filter 22, a cyclone, not shown in the drawings, will create a vacuum in the ducting 34 and consequently in the liquid collectors 28.1, 28.2, ..., 28.n located underneath the belt filter 22 in the first and second belt filter sections 24 and 26. As the coal slurry is now transported on the belt filter 22 along the first belt filter section 24, the fine coal material will become liberated from the water and the water will be drawn through the belt filter 22 under the influence of the vacuum to collect in the liquid collectors 28.1, 28.2, ... 28.n. From the liquid collectors 28.1, 28.2, ... 28.n the collected water will be drawn via the ducting 34 to a liquid storage container, not shown in the drawings, for future re-use.

At the end of the first belt filter section 24 the slurry will have undergone a first drying cycle and partially dry fine coal material will have been formed. Persons skilled in the art will be well aware of the fact that when slurry is hydraulically placed, the fine coal material will be aligned in such a manner that the optimum amount of fine coal material can be transported in a specific volume. The result of this is a high bulk density with a very low degree of permeability such that once the slurry has undergone the first drying cycle, water may still be trapped between the particles of the fine coal material. It would, therefore, be appreciated that if the permeability of the fine coal material could be increased, trapped water could be released and removed from the fine coal material.

This object is addressed by means of mechanically placing the partially dry fine coal material 36. By allowing the partially dry fine coal material to fall onto the second belt filter section 26, the fine coal material will be realigned randomly with the effect that previously trapped water can now be exposed to the effects of the vacuum created in the liquid collectors 28.1, 28.2, ..., 28.n and can be drawn through the belt filter 22 to be fed via the ducting 34 to the liquid storage container mentioned above. While the partially dry fine coal material moves along the second belt filter section it will encounter the cam 40, constituting the agitator formation, and the orientation of the fine coal material will again be redistributed such that any remaining moisture can be removed. At the end of the second belt filter section 26 the fine coal material will have undergone a second drying cycle and will be dried to the satisfaction of an end user and ready for consumption by end-users. As shown, at the end of the second belt filter section 26 the dry fine material is tipped unto a conveyor belt 44 to be transported to a storing facility.

Figure 4:
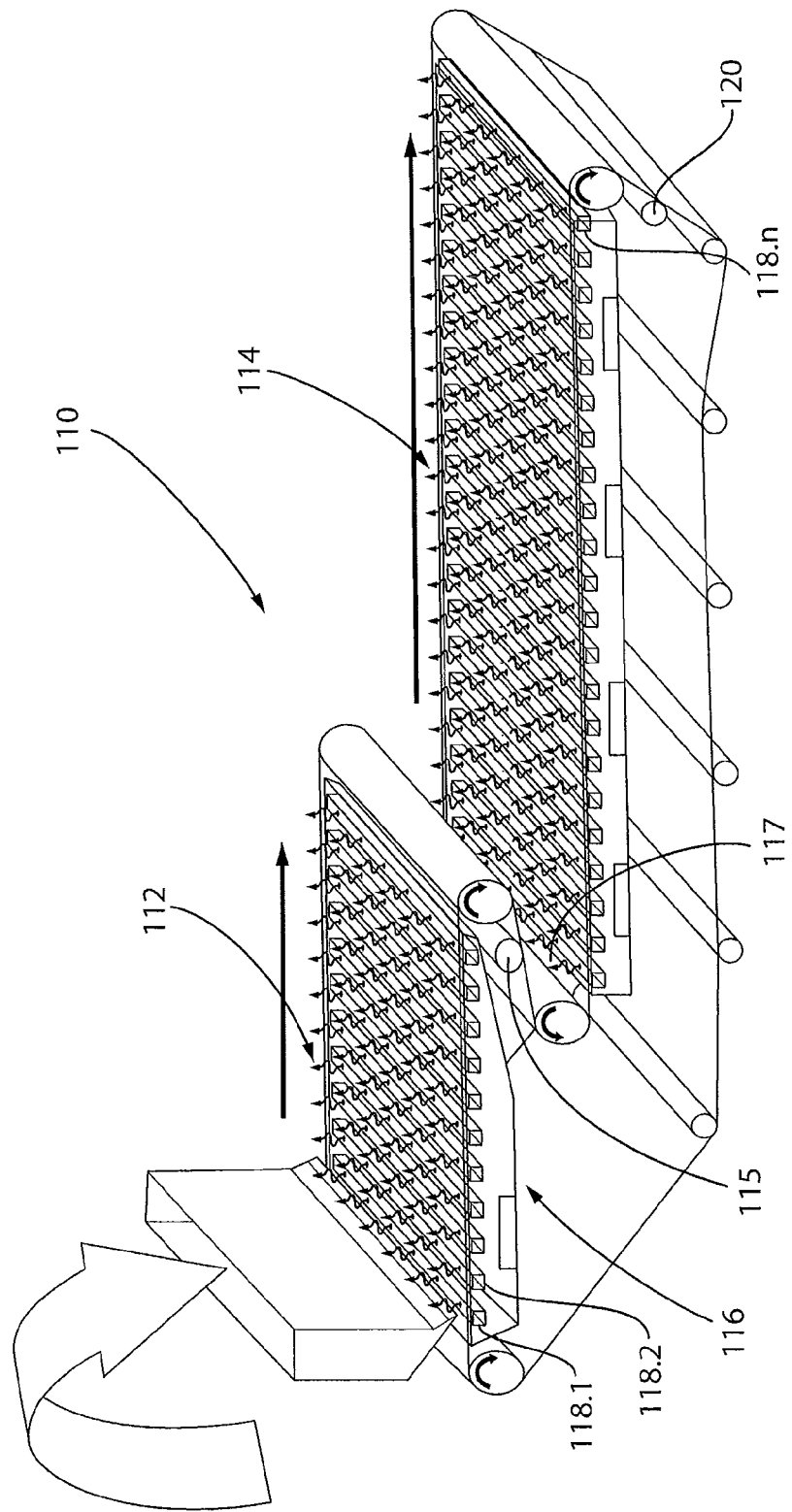
FIG. 4 provides a diagrammatic representation of a belt filter apparatus in accordance with a second embodiment of the invention.

FIG. 4 shows a second embodiment of a belt filter apparatus in accordance with the present invention, generally indicated with the reference numeral 110. The belt filter apparatus 110 operates on the same principles as the belt filter apparatus 10 and no further description is consequently necessary. The belt filter apparatus 110 does, however, differ from the belt filter apparatus 10 in that both the first and second belt filter sections 112 and 114 are provided with an agitator formation 116.

The agitator formation 116 in this embodiment of the invention comprises a plurality of blowers 118.1, 118.2, ..., 118.n which serve to redistribute partially dry fine material on the first and the second belt filter sections 112 and 114, such that the amount of trapped water being released from between the particles constituting the partially dry fine material can be increased, consequently enhancing the effectiveness of the belt filter apparatus 110. In particular the agitator formation 116 serves to create mechanical lift of the solids constituting the fine material, so that the trapped liquid may fall past the solids and drain from the coal slurry. This mechanical lift is created in that the agitator formation 116 causes the fine material solids to bounce on the belt filter sections 112 and 114.

The belt filter apparatus 110 further differs from the belt filter apparatus 10 in that it includes means for mechanically placing the partially dry fine material which is provided in the form of a rotatable cam 115 which is placed proximate a drop-off point 117 located between the first belt filter section and the second belt filter section. The purpose of the cam 115 is to impact on the belt filter, thereby forcing the fine material on the belt filter to fall onto the second belt filter section.

Finally, the belt filter apparatus 110 differs from the belt filter apparatus 10 in that it includes removal means, here a further cam 120, which is located towards the end of the second belt filter section 114. In use the cam 120 will impact on the belt filter to ensure that all fine material is displaced therefrom.

Although not specifically described above it is envisaged that the agitator formation could comprise a combination of cams and blowers.

It is further pointed out that the second belt filter section 114 need not necessarily be exposed include members of the agitator formation 116 and that only the first belt filter section 112 will be exposed to the effects of the agitator formation 116.

It is envisaged that the belt filter apparatus need not comprise a first and second belt filter section but could merely comprise a single belt filter section with a single belt filter having an agitator formation for redistributing fine material transported thereon.

It is also envisaged that the belt filter need not necessarily be provided in the form of a non-woven fabric but could also be a micro-pore fabric.

The belt filter apparatus of the invention need not only be employed for drying coal slurry but could be also find application in drying any slurry or liquid containing a combination of fines and liquids, whether organic or inorganic.

The belt filter apparatus of the invention can be modular in nature to allow it to have more than just two belt filter sections, consequently allowing for a number of mechanical placements through the use of the means for mechanically placing.

It is envisaged that where the slurry to be dried has physical characteristics that will allow it, the means for mechanical placing can simply be provided in the form of a drop-off point such that partially dry fine material is mechanically placed and thus redistributed as it falls under the influence of gravity form the first belt filter section onto the second belt filter section.

Advantages of the belt filter apparatus and the method of the invention includes low implementation, operating and maintenance costs as well as immediate water recovery and recycling. Making use of a belt filter as described above further reduces down-time and consequently increases efficiency.

The invention claimed is:

1. A belt filter apparatus comprising:
    at least one belt filter section on which a mixture of a fine material and a liquid can be placed in order to undergo a drying cycle, the belt filter section including a belt filter comprised of a permeable fabric;
    a plurality of blowers provided under the belt filter for redistributing the mixture of fine material and liquid on the belt filter section by creating lift of the fine material; and
    a liquid collection arrangement for providing fluid communication between the belt filter section and a vacuum, wherein the vacuum dries the fine material by drawing liquid through the permeable fabric of the belt filter section and into the liquid collection arrangement.

2. The belt filter apparatus of claim 1, wherein the plurality of blowers and the liquid collection arrangement are arranged to form repeating sequences of vacuum and lift along a length of the belt section.

3. The belt filter apparatus of claim 1, wherein the belt filter apparatus further comprises:
    a first belt filter section on which a mixture of fine material and a liquid can be placed hydraulically in order to undergo a drying cycle to create partially dry fine material, the first belt filter section including a belt filter comprised of a permeable fabric;
    a second belt filter section on which the partially dry fine material can be placed in order to undergo a drying cycle, the second belt filter section including a belt filter comprised of a permeable fabric; and
    a mechanism for mechanically placing the partially dry fine material from the first belt filter section onto the second belt filter section.

4. The belt filter apparatus according to claim 3, wherein the first and second belt filter sections are formed by providing a first set of pulleys and a second set of pulleys about which a belt filter medium can be moved.

5. The belt filter apparatus according to claim 3, wherein the mechanism for mechanically placing the partially dry fine material comprises an impulse blower which is located proximate to a drop-off point between the first belt filter section and the second belt filter section, the impulse blower serving to impart jets of air onto the first belt filter section such that the partially dry fine material on the belt filter can be forced therefrom to fall onto the second belt filter section.

6. The belt filter apparatus according to claim 3, wherein the mechanism for mechanically placing the partially dry fine material comprises a cam which is located proximate to a drop-off point between the first belt filter section and the second belt filter section, the cam serving to impact on the first belt filter section thereby forcing the partially dry fine material to fall onto the second belt filter section.

7. The belt filter apparatus according to claim 1, wherein the liquid collection arrangement includes liquid collectors which are locatable below the first and second belt filter sections for collecting liquid which is removed from the fine material during the first and second drying cycles.

* * * * *